United States Patent [19]

Galvin

[11] 3,896,464
[45] July 22, 1975

[54] HOLDING MEANS FOR HOLDING A ROLL OR SHEET FILM HOLDER IN PRESS AND VIEW CAMERAS

[76] Inventor: James Murry Galvin, 920-47th St., Sacramento, Calif. 95819

[22] Filed: May 13, 1974

[21] Appl. No.: 469,077

[52] U.S. Cl. ............................................. 354/161
[51] Int. Cl. ............................................ G03b 17/44
[58] Field of Search ............................. 354/161, 275

[56] References Cited
UNITED STATES PATENTS

| | | | |
|---|---|---|---|
| 304,406 | 9/1884 | Blair | 354/161 |
| 2,549,670 | 4/1951 | Dalton | 354/161 |

*Primary Examiner*—John M. Horan
*Attorney, Agent, or Firm*—Mark C. Jacobs

[57] ABSTRACT

Improvements in holding means for holding a roll or sheet film holder in operative position in press and view cameras. The holding means includes a back panel and a focusing panel and improved cooperating means on both panels for connecting the back panel to the focusing panel while urging the focusing panel against the back panel yet permitting the focusing panel to be moved away from the back panel a sufficient distance to permit the insertion of a holder for roll, sheet or Polaroid film.

13 Claims, 7 Drawing Figures

PATENTED JUL 22 1975　　3,896,464

SHEET 1

HOLDING MEANS FOR HOLDING A ROLL OR SHEET FILM HOLDER IN PRESS AND VIEW CAMERAS

BACKGROUND OF THE INVENTION

1. Field of the Invention

The invention relates to press and view cameras; and, more particularly, to improvements in holding means for press and view cameras which can accommodate sheet, roll and Polaroid films.

2. Description of the Prior Art

Press and view cameras are well known in the prior art. Such cameras may have a focusing plane connected to the back of the camera so that this plane can be moved away from the back, after the camera has been focused, to permit film insertion between the panel and the back of a film pack.

In a prior art patent to Dalton U.S. Pat. No. 2,549,670, one such structure is disclosed. However, this camera back can only accommodate a sheet film holder without disengaging parts. In Dalton, a roll holder may be used by removal of the focusing panel or by using the slide locks to attach the roll film holder or film pack adapter in place. Obviously, this is quite cumbersome. It is desirable that the user of a press or view camera be able to use this camera with roll, Polaroid, and sheet film. Such a camera should have a focusing panel connected to the camera back and held thereagainst under spring pressure. When the film is inserted between the focusing panel and the back, the spring tension on the panel should clamp the film in place. No other clamping means can be provided because the arms, by which the focusing panel is connected to the back, interfere.

SUMMARY OF THE INVENTION

It is an object of this invention to provide improved holding means for a press and view camera which can accommodate Polaroid, sheet or roll film.

It is a further object of this invention to provide such holding means which can be quickly and easily adapted for use with most conventional press or view cameras.

These and other objects are preferably accomplished by providing holding means for holding a Polaroid, roll or sheet film holder in operative position in a press or view camera. The holding means includes a back panel and a focusing panel and improved cooperating means on both panels for connecting the back panel to the focuing panel against the back panel yet permitting the focusing panel to be moved away from the back panel a sufficient distance to permit the insertion of a roll, Polaroid or sheet film holder therebetween.

DESCRIPTION OF THE PREFERRED EMBODIMENT

Figure 1:
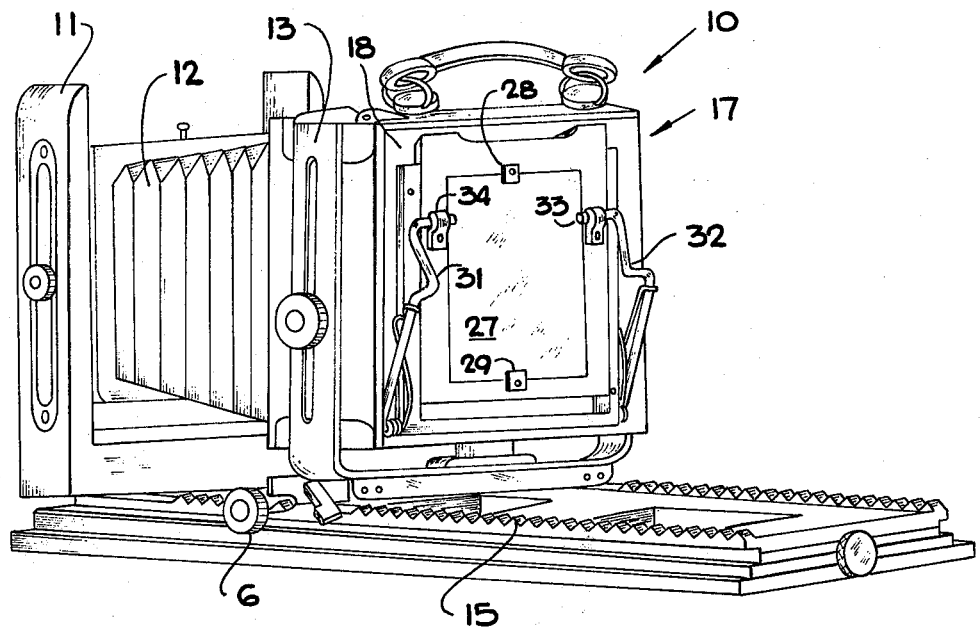
FIG. 1 is a perspective view of a conventional view type camera showing a holder in accordance with the invention positioned thereon.

Referring now to FIG. 1 of the drawing, a conventional view type camera 10 is shown, the camera itself forming no part of this invention and merely shown for purposes of illustration alone. Thus, any suitable press or view camera may be used. Such a camera may have a body 11, a bellows 12 and an exposure opening section 13. Means such as a track 15 and an adjusting screw 16, may be provided for moving the exposure opening section 13 with respect to the camera body 11 for focusing the camera all as is well known in the camera art. However, as particularly contemplated within the present invention, in an exemplary embodiment, means are provided for holding roll, sheet, Polaroid or other film.

Such holding means, indicated generally at 17, is shown mounted on the exposure opening section 13 of camera 10.

Figure 2:
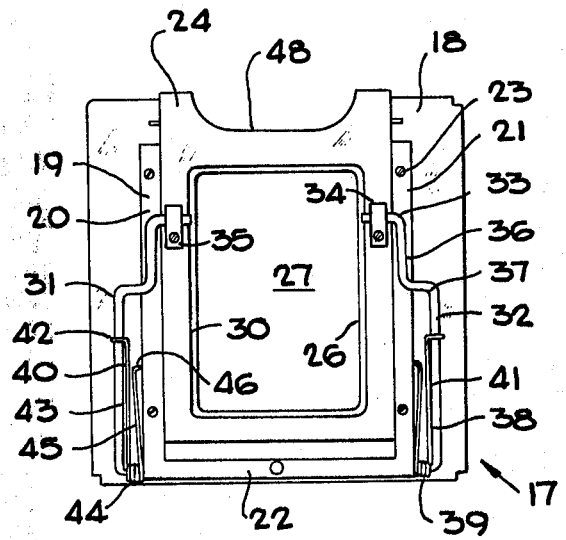
FIG. 2 is a front view of the holder of FIG. 1.
Figure 4:
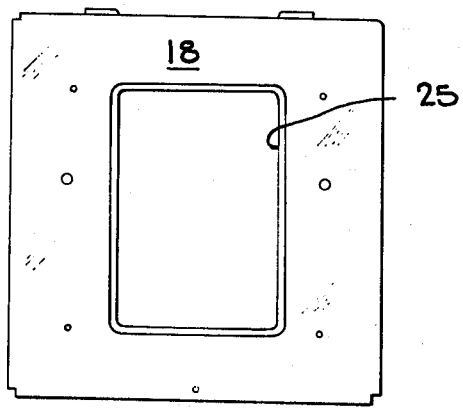
FIG. 4 is a back view of the holder of FIGS. 1 through 3.
Figure 5:
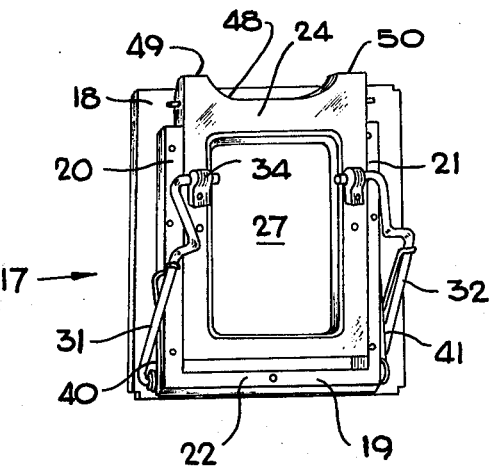
FIG. 5 is a perspective view of the holder alone of FIG. 1 removed from the camera body.

Referring now more particularly to FIGS. 2, 4 and 5, holding means 17 includes a back panel 18 which may be secured to the exposure opening section 13 of camera 10 in any suitable manner, such as by screws or the like. A film holder guide 19 is provided on back panel 18 and is generally U-shaped. That is, guide 19 includes a pair of elongated frame members or arms 20, 21 which may be connected at one end to a shorter arm 22 (or be an integral U-shaped member) and open at the top as shown in FIG. 2. This guide 19 may be secured to back panel 18 in any suitable manner, such as by screws 23 or the like. It is to be understood that the distance between arms 20, 21 is related to the width of the film holder to be inserted. This panel 24 is adapted to abut against back panel 18 retained within guide 19 between arms 20, 21 and be releasable therefrom. Back panel 18, as shown in FIG. 4, also includes a centrally located opening 25 which opening generally conforms to a ground glass opening 26 in focusing panel 24 as seen in FIG. 2. A ground glass 27 is secured within opening 26. As shown in FIG. 1, screws 28 screwed into panel 24 may be used to clamp clips 29 or the like against glass 27 to hold the glass 27 in position. A peripheral shoulder 30 may be provided in opening 26 to accommodate glass 27.

Panel 24 is resiliently clamped into position between arms 20, 21 by means of arms 31, 32 (It is to be understood that panel 24 is appreciably greater in width than the opening 25 in back panel 18 so that it is resiliently retained in position within guide 19 and with glass 27 corresponding with opening 25).

Each arm 31, 32, referring particularly to FIG. 2, is pivotally connected at one end to the focusing panel 24 at opposite sides thereof, respectively, by means of a terminal end portion 33 extending into a collar member 34 or the like and pivotally movable therein. These collar members 34 are secured in position on panel 24 by means of suitable screws 35 or the like. If desired, lock washers (not shown) or the like may be provided to retain terminal end portions 33 within collar members 34. In one embodiment of the invention, arms 31, 32 include elongated portions 36 integral with terminal end portions 33 and extending generally normal thereto and generally parallel to the arms 20, 21 of guide 19. Integral offset portions 37 then extend outwardly away from portions 36 and generally normal to portions 36. Integral elongated portions 38 then extend back generally parallel to arms 20, 21 but offset from portions 36. Finally, portions 38 terminate in end portions 39 extending generally normal to portions 38 (and generally parallel to end portions 33) and pivotally movable within suitable aligned apertures (not visible) in the shorter arm 22 of guide 19 (or in the ends of elongated arms 20, 21).

This configuration permits focusing panel 24 to be pivoted about end portions 33 and 39 and moved to and away from back panel 18. Tensioning means are provided for constantly urging arms 31, 32 toward back panel 18. In the exemplary embodiment, such tensioning means includes a pair of tension springs 40, 41, one associated with each arm 31, 32. Each spring 40, 41 includes a hook portion 42 encircling the elongated portion 38 of each arm 31, 32 integral with an elongated portion 43 extending generally parallel to portion 38 and encircling the terminal end portion 39 to form a helical portion 44, then including an integral elongated portion 45 terminating in an end portion 46 snap-fitting into a suitable aperture (not shown) in each elongated arm 20, 21 of guide 19. It can be appreciated that arms 31, 32 permit the focusing panel 24 to be pulled away from back panel 18 whereas springs 40, 41 constantly urge panel 24 against back panel 18.

It is to be understood that the photographer would focus camera 10 in his usual manner, then collapse the focusing hood, if applicable to the camera being used, and close and latch the hood door, all as is well known in the camera art.

Figure 3:
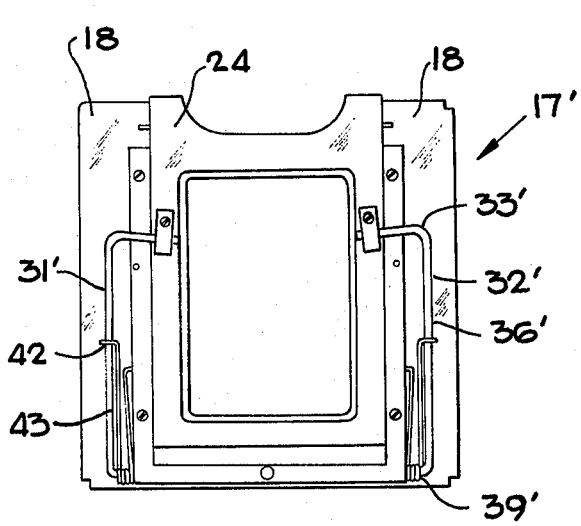
FIG. 3 is a front view of an alternate embodiment of the holder of FIG. 1.

A specific offset arm configuration is disclosed in FIGS. 1, 2 and 5 for arms 31, 32 since, in certain instances, other configurations might interfere with certain components of the film holder desired to be inserted in the camera, such as a winder for a roll film holder. However, these arms may be straight if such interference is not possible. For example, as shown in FIG. 3 wherein like numerals refer to like parts of the holding means 17 of FIG. 1, an alternate holding means 17' is shown wherein arms 31', 32' include terminal end portions 33' appreciably longer than end portions 33, integral elongated portions 36' replacing aforementioned portions 36, 37 and 38, and integral short terminal end portions 39'. Thus, with this arm configuration, arms 31', 32' would not interfere with the film winder of a roll film holder or the like.

The operation of holding means 17 and 17' will now be described with respect to FIGS. 6 and 7. The holding means 17' of FIG. 3 is illustrated in FIGS. 6 and 7 but the comments set forth hereinbelow are applicable to the arms 31, 32 of holding means 17 and the arms 31', 32' of holding means 17'.

Figure 6:
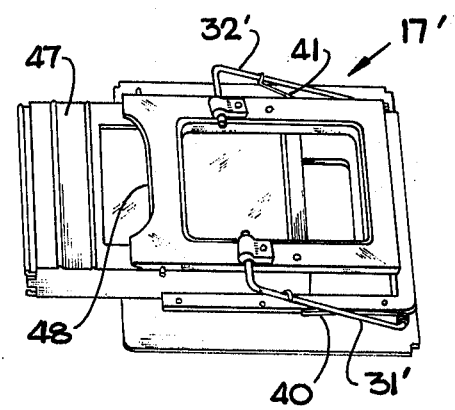
FIG. 6 is a perspective view of the holder of FIG. 3 showing a sheet film positioned thereon.
Figure 7:
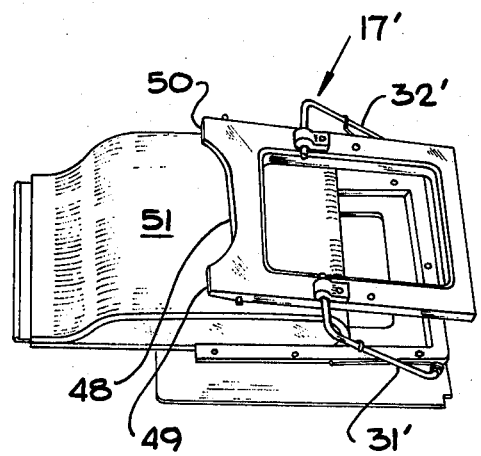
FIG. 7 is a perspective view of the holder of FIG. 3 showing a roll film positioned thereon.

Referring now to FIGS. 6 and 7, the photographer may now insert Polaroid, sheet, or roll film into position on camera 10. In accordance with the invention and as shown in FIG. 6, a conventional sheet film holder 47 is shown in position on holding means 17'. Thus, the photographer simply grasps the focusing panel 24 and pulls it away from back panel 18. The panel 24 may have a cut-out portion 48 and tapered end tabs 49, 50 for enabling the photographer to easily lift the panel 24 off of back panel 18. The sheet film holder 47 is now inserted between the back panel 18 and the focusing panel 24. The film holder 47 now occupies the space previously occupied by the focusing panel 24 and the film therein which is to be exposed is now in the same plane as the ground glass 27 was when the focusing panel 24 was in its forward, focusing position. The tension of springs 40, 41 applied through arms 31', 32' holds the film holder 47 firmly seated within guide 19 which position focusing panel 24 previously occupied. That is, guide 19 is configured to receive the holder 47 therein. For example, conventional film holders may be about 3 inches in width — thus, the distance between arms 20 and 21 of guide 19 is about 3 inches (of course, the width of focusing panel 18 would also be 3 inches).

It can be seen, therefore, that holding means 17' quickly and easily accommodates a sheet film holder 47. However, in the prior art patent to Dalton discussed hereinabove, if a film holder wider than a sheet film holder, such as a conventional roll film holder, which may be appreciably greater in depth than a sheet film holder, was to be used by the photographer, it was necessary that he remove the focusing panel. In addition to being time-consuming, if the photographer decided to focus between exposures, he had to disengage the roll film holder and put the focusing panel back into place, then once again remove the focusing panel and replace the roll film holder. The problems involved in these operations are obvious. Many interesting and desirable shots might be lost to the photographer.

Thus, as shown in FIG. 7, a conventional roll film holder 51 may be quickly and easily inserted between the focusing panel 24 and the back panel 18 of holding means 17' in the same manner as sheet film holder 47. The length of arms 31', 32' are such that the wider roll film holder 51 is accommodated in holding means 17' and clamped against the back panel 18 as securely as sheet film holder 47. The configuration of springs 40, 41 urges the focusing panel 24 against either film holder 47 and 51 whereas the guide 19 aligns the film holder in its proper position with respect to camera 10. Thus, such arm-spring combination permits the holding means disclosed herein to accommodate Polaroid, roll or sheet film without the necessity of removng the focusing panel.

Other modifications may occur to those skilled in the art. Thus, for example, the arms 31, and 32 may be two pieces as disclosed herein or one piece of metal bent such that it passes through guide 19 laterally from one side to the other hidden from view. The invention disclosed herein is only to be limited by the appended claims.

I claim as my invention:

1. In a roll, sheet or Polaroid film holder holding means for a press or view camera or the like wherein said holding means includes a back panel, a focusing panel, cooperating means on both the back panel and the focusing panel for connecting said focusing panel to said back panel and urging said focusing panel against said back panel while permitting said focusing panel to be moved away from said back panel to allow the insertion of a roll or sheet or Polaroid film holder between said focusing panel and said back panel wherein said roll film holder is substantially greater in thickness than said sheet or Polaroid film holder, said focusing panel having a ground glass opening therein aligned with an opening in said back panel when said focusing panel is urged against said back panel, the improvement which comprises:

said cooperating means includes a pair of arms, one of said arms being pivotally connected at one end to one side of said back panel and at the other end pivotally connected to said focusing panel on the side opposite the side thereof adapted to abut said back panel, the other of said arms being pivotally connected at one end to the opposite side of said back panel and at the other end pivotally connected to said focusing panel, on the side opposite the side thereof adapted to abut said back panel, and tensioning means associated wiht each of said arms, each of said tensioning means being operatively connected at one end to said back panel and at the other end to said respective arm, wherein said back panel includes a guide having at least a pair of spaced elongated guide members disposed on each side of the opening in said back panel and spaced therefrom, said focusing panel being retained between said elongated guide members when said focusing panel is in abutting engagement with said back panel.

2. In the holding means of claim 1 wherein each of said arms is an integral member having one terminal end pivotally connected to an aperture in said back panel and the free end pivotally connected to an abutment member integrally connected to said focusing panel.

3. In the holding means of claim 2 wherein said abutment members are on the side of said focusing panel opposite the side thereof adapted to abut said back panel.

4. In the holding means of claim 2 wherein said arms comprise one integral piece.

5. In a roll, sheet or Polaroid film holder holding means for a press or view camera or the like wherein said holding means includes a back panel, a focusing panel, cooperating means on both the back panel and the focusing panel for connecting said focusing panel to said back panel and urging said focusing panel against said back panel while permitting said focusing panel to be moved away from said back panel to allow the insertion of a roll or sheet or Polaroid film holder between said focusing panel and said back panel wherein said roll film holder is substantially greater in thickness than said sheet or Polaroid film holder, said focusing panel having a ground glass opening therein aligned with an opening in said back panel when said focusing panel is urged against said back panel, the improvement which comprises:

said cooperating means includes a pair of arms, one of said arms being pivotally connected at one end to one side of said back panel and at the other end to one side of said focusing panel, the other of said arms being pivotally connected at one end to the opposite side of said back panel and at the other end to the opposite side of said focusing panel, and tensioning means associated with each of said arms, each of said tensioning means being operatively connected at one end to said back panel and at the other end to said respective arm wherein each of said arms is an integral member having a first terminal end portion pivotally connected to one end of one of said elongated guide members of said guide, an elongated portion extending generally normal from said first terminal end portion and generally parallel to said last-mentioned elongated guide member, a first portion extending generally normal to said elongated portion and inwardly of said focusing panel, a second portion extending generally normal from said first portion and generally parallel to said last-mentioned elongated guide member, and a second terminal end portion extending generally normal from said second portion pivotally connected to said focusing panel on the side thereof opposite the side adapted to abut against said back panel, and wherein said back panel includes a guide having at least a pair of spaced elongated guide members disposed on each side of the opening in said back panel and spaced therefrom, said focusing panel being retained between said elongated guide members when said focusing panel is in abutting engagement with said back panel.

6. In the holding means of claim 1 wherein each of said arms is an integral member having a first terminal end portion pivotally connected to one end of one of said elongated guide members of said guide, an elongated portion extending generally normal from said first terminal end portion and generally parallel to said last-mentioned elongated guide member, a first portion extending generally normal to said elongated portion and inwardly of said focusing panel, a second portion extending generally normal from said first portion and generally parallel to said last-mentioned elongated guide member, and a second terminal end portion extending generally normal from said second portion pivotally connected to said focusing panel on the side thereof opposite the side adapted to abut against said back panel.

7. In the holding means of claim 5 wherein each of said tensioning means includes an integral spring having one end secured to one of the elongated guide members of said guide, then extends about the terminal end portion of said arm pivotally connected to said guide, then extends generally parallel to the elongated portion of said arm and terminates in a spring terminal portion secured to the elongated portion of said arm adjacent the junction of said elongated portion with said first portion.

8. In a roll, sheet or Polaroid film holder holding means for a press or view camera or the like wherein said holding means includes a back panel, a focusing panel, cooperating means on both the back panel and the focusing panel for connecting said focusing panel to said back panel and urging said focusing panel against said back panel while permittng said focusing panel to be moved away from said back panel to allow the insertion of a roll or sheet or Polaroid film holder between said focusing panel and said back panel wherein said roll film holder is substantially greater in thickness than said sheet or Polaroid film holder, said focusing panel having a ground glass opening therein aligned with an opening in said back panel when said focusing panel is urged against said back panel, the improvement which comprises:

said cooperating means includes a pair of arms, one of said arms being pivotally connected at one end to one side of said back panel and at the other end to one side of said focusing panel, the other of said arms being pivotally connected at one end to the opposite side of said back panel and at the other end to the opposite side of said focusing panel, and tensioning means associated with each of said arms, each of said tensioning means being operatively connected at one end to said back panel and at the other end to said respective arm wherein each of said arms is an integral member having a first terminal end portion pivotally connected to one end of one of said elongated guide members of said guide, an elongated portion extending generally normal to said first terminal end portion and generally parallel to said last-mentioned elongated guide member, and a second terminal end portion extending generally normal to said elongated portion pivotally connected to said focusing panel on the side thereof opposite the side adapted to abut against said back panel and further wherein said back panel includes a guide having at least a pair of spaced elongated guide members disposed on each side of the opening in said back panel and spaced therefrom, said focusing panel being retained between said elongated guide members when said focusing panel is in abutting engagement with said back panel.

9. In the holding means of claim 8 wherein each of said tensioning means includes an integral spring having one end secured to one of the elongated guide members of said guide, then extends about the first terminal end portion of said arm, then extends generally parallel to the elongated portion thereof and is secured thereto adjacent said second terminal end portion.

10. In the holding means of claim 1 wherein said back panel includes a pair of elongated abutment members extending on opposite sides of said opening in said back panel and spaced therefrom, the distance between said abutment members being related to the width of said focusing panel.

11. In a roll, sheet or Polaroid film holder holding means for a press or view camera or the like wherein said holding means includes a back panel, a focusing panel, cooperating means on both the back panel and the focusing panel for connecting said focusing panel to said back panel and urging said focusing panel against said back panel while permitting said focusing panel to be moved away from said back panel to allow the insertion of a roll or sheet or Polaroid film holder between said focusing panel and said back panel wherein said roll film holder is substantially greater in thickness than said sheet or Polaroid film holder, said focusing panel having a ground glass opening therein aligned with an opening in said back panel when said focusing panel is urged against said back panel, the improvement which comprises:

said cooperating means includes a pair of arms, one of said arms being pivotally connected at one end to one side of said back panel and at the other end to one side of said focusing panel, the other of said arms being pivotally connected at one end to the opposite side of said back panel and at the other end to the opposite side of said focusing panel, and tensioning means associated with each of said arms, each of said tensioning means being operatively connected at one end to said back panel and at the other end to said respective arm wherein each of said arms is an integral member having one terminal end pivotally connected to an aperture in said back panel and the free end pivotally connected to an abutment member integrally connected to said focusing panel, and further wherein said back panel includes a guide having at least a pair of spaced elongated guide members disposed on each side of the opening in said back panel and spaced therefrom, said focusing panel being retained between said elongated guide members when said focusing panel is in abutting engagement with said back panel.

12. In the holding means of claim 11 wherein said abutment members are on the side of said focusing panel opposite the side thereof adapted to abut said back panel.

13. In the holding means of claim 11 wherein said arms comprise one integral piece.

* * * * *